(12) United States Patent
Atkinson et al.

(10) Patent No.: US 6,650,948 B1
(45) Date of Patent: Nov. 18, 2003

(54) TRAFFIC FLOW MONITORING

(75) Inventors: Ian Malcolm Atkinson, Edinburgh (GB); Thomas Bruce Watson Adam, Biggar (GB); Michael Joseph Dixon, Edinburgh (GB)

(73) Assignee: Applied Generics Limited, Biggar (GB)

( * ) Notice: Subject to any disclaimer, the term of this patent is extended or adjusted under 35 U.S.C. 154(b) by 513 days.

(21) Appl. No.: 09/722,660

(22) Filed: Nov. 28, 2000

(51) Int. Cl.⁷ .................................................. G08G 1/09
(52) U.S. Cl. ..................... 700/66; 701/117; 701/118; 701/213; 340/995.13; 340/995.14; 340/995.19
(58) Field of Search ........................... 700/66; 701/117, 701/118, 200, 207, 213; 340/995.1, 995.12, 995.13, 995.14, 995.19; 455/456.1, 456.6, 457

(56) References Cited

U.S. PATENT DOCUMENTS

| | | | |
|---|---|---|---|
| 6,463,382 B1 * | 10/2002 | Bullock ....................... | 701/117 |
| 6,480,783 B1 * | 11/2002 | Myr ............................. | 701/117 |
| 6,490,519 B1 * | 12/2002 | Lapidot et al. ............. | 701/117 |
| 6,496,773 B1 * | 12/2002 | Olsson ....................... | 701/117 |
| 6,505,114 B2 * | 1/2003 | Luciani ....................... | 701/117 |
| 6,574,548 B2 * | 6/2003 | DeKock et al. ............. | 701/117 |

* cited by examiner

*Primary Examiner*—Paul P. Gordon
(74) *Attorney, Agent, or Firm*—Venable LLP; Norman N. Kunitz

(57) ABSTRACT

The present invention relates to a method for monitoring vehicular traffic flow in a road network 1 in an area served by a mobile telecommunications device network 7 having a call management system 10 provided with a mobile telecommunications device positioning system 11 providing positional data for active mobile telecommunications devices 12. The method comprises capturing geographical positioning data for individual active devices carried aboard vehicles 12 and converting these into probability vectors representing the likelihood of the vehicle having arrived at any of the possible road components 16 of the road network 7 compatible with the geographical positional data. As the vehicle 12 travels along, this process is repeated and new probability vectors constructed based on the probability of any of the available routes between the new probability vector road component position and the immediately preceding probability vector road component position. The expected transit time $\Delta t_x$ for the available routes are computed and compared with actual transit times $\Delta t$ to provide delay factors for the available routes and thereby the road components thereof. Average delay factors are obtained by making use of data obtained for other vehicles thereby to provide a report indicative of the degree of traffic congestion and delay on the roads. The invention also provides apparatus and computer software program products for use in implementing the invention.

40 Claims, 5 Drawing Sheets

TRAFFIC FLOW MONITORING

BACKGROUND OF THE INVENTION

The present invention relates to the monitoring of vehicular traffic flow in a road network, and more particularly to the generation of traffic congestion reports.

With ever increasing road traffic levels there is a particular need for the rapid generation of traffic congestion reports in order to enable a rapid response thereto such as action to remove the cause of traffic congestion, and avoiding action by road users approaching an area of traffic congestion.

Existing methods generally depend on physical detection of the vehicles by direct visual observation or by using various kinds of sensors such as cameras or proximity sensors embedded in the roadway etc. The former approach can provide only extremely limited coverage due to the large number of personnel required, while the latter requires the installation in the road network of a very extensive and expensive infrastructure.

It is an object of the present invention to avoid or minimise one or more of the above problems or disadvantages.

SUMMARY OF THE INVENTION

The present invention provides a vehicular traffic flow monitoring method for monitoring vehicular traffic flow in a road network in an area served by a mobile telecommunications device network having a call management system provided with a mobile telecommunications device positioning system providing positional data in respect of at least active mobile telecommunications devices belonging to said mobile telecommunications device network, said method comprising the steps of:

a. capturing first geographical positional data for an active mobile telecommunications device in use on a vehicle at a given time $t_1$;

b. intersecting said first geographical positional data with road network mapping data defining said road network in terms of road components each representing a discrete part of the road network, so as to identify original possible road components corresponding to said first geographical positional data;

c. generating an initial probability vector representing the likelihood of said vehicle having arrived at a position on a given one of said original possible road components for all of said original possible road components;

d. capturing second geographical positional data for said mobile telecommunications device at a later time $t_2 = t_1 + \Delta t$ where $\Delta t$ is the actual transit time of said device between said first and second geographical positions;

e. intersecting said second geographical positional data with said road network mapping data, so as to identify new possible road components corresponding to said second geographical positional data;

f. identifying available routes in the road network linking said possible road components corresponding to said first and second geographical positional data which routes are constituted by a series of road components;

g. generating an updated probability vector representing the likelihood of said vehicle having arrived at a position on a given one of said new possible road components in the road network corresponding to said second geographical positional data at said later time $t_2$ via one of said available routes, for all of said new possible road components;

h. intersecting said available routes with expected average vehicle speed data for the road components of each of said series of road components constituting said available routes so as to determine expected transit times for said available routes;

i. directly or indirectly comparing the actual transit time with the expected transit times for each of said available routes so as to produce delay factors for said routes indicative of the degree of vehicular traffic congestion on the individual road components thereof at the time; and j. determining an average delay factor for a plurality of vehicles using a given road component, which average is weighted on the basis of at least the likelihood of any of the available routes having been followed.

In another aspect the present invention provides a vehicular traffic monitoring system suitable for use in the method of the present invention and comprising a computer system having:

a storage device; a processor connected to the storage device; and at least one interface connected to the processor, the storage device storing digital mapping information for a road network, expected vehicle speed for road components of said road network, and a database of at least: probability vectors representing the likely positions of moving active mobile telecommunications devices over a period of time and the likely routes thereof to said likely positions, and current road delay factor information;

said at least one interface coupling said processor to a mobile telecommunications device network call management system for interrogating said management system and receiving positioning data for active individual mobile telecommunications device therefrom; and coupling said processor to user enquiry systems for receiving road traffic delay enquiries from, and transmitting road traffic delay reports to, said user enquiry systems; and the processor operative with the program to:

a) capture geographical positional data for a mobile telecommunications device;

b) intersect said geographical positional data with road network mapping data defining said road network in terms of road components each representing a discrete part of the road network, so as to identify possible road components corresponding to said geographical positional data;

c) generate a probability vector representing the likelihood of said vehicle having arrived at a position on any of said possible road components;

d) identify available routes in the road network linking said possible road components corresponding to a given geographical positional data and preceding possible road component corresponding to a preceding geographical positional data, which routes are constituted by a series of road components;

e) intersect said available routes with expected average vehicle speed data for the road components of said series of road components constituting said available routes so as to determine expected transit times for said available routes;

f) directly or indirectly compare the actual transit time with the expected transit time for each of said available routes so as to produce delay factors for said routes indicative of the degree of vehicular traffic congestion on the individual road component thereof at the time;

g) determine an average delay factor for a plurality of vehicles using a given road component, which average is weighted on the basis of at least the likelihood of a given available route having been followed;

h) repeatedly update said database of moving active mobile telecommunication devices and road components with vehicle position and road delay factor information; and i) retrieve road delay factor information from said database in response to enquiries from user enquiry systems and provide road delay factor reports thereto.

Thus by means of the present invention it is possible to provide road traffic delay reports for a road network, which are substantially live i.e. based on historical road traffic flows immediately before the reports are generated, using only suitably programmed data processing equipment connected to a mobile telecommunications device network, without the need for providing the road network with any new infrastructure.

As used herein, the expression mobile telecommunications device network indicates any telecommunications device system in which a multiplicity of mobile subscribers (MS) with mobile telecommunications devices (which may be conveniently referred to herein for brevity as MS devices) can communicate with each other and/or fixed-line subscribers via one or more transmitter/receiver stations which may be terrestrial and/or extra-terrestrial.

It will be appreciated that the present invention requires to discriminate not only between mobile telecommunications devices located in or on road vehicles and those located inside buildings or being carried be pedestrians etc., but also between those carried by vehicles travelling along the road network which might at times be temporarily stationary e.g. at traffic lights and those carried in vehicles which are parked and not travelling at the time. This may be achieved by a number of different positioning system technologies which are available for generating geographical positional data or proto-geographical positional data for individual mobile telecommunications devices when they are active i.e. involved in sending and/or receiving data or voice messages. It will be appreciated that different positioning technologies may be used with different types of network. One widely used mobile telephone system is GSM (Global System for Mobile Communication) which is a global standard and is currently deployed by over 300 operators in over 140 countries world-wide. GSM is deployed in the UK by Vodafone, Orange, BT Cellnet and One-2-One and in the USA by various companies including Omnipoint, Sprint and Airtouch. The next generation digital mobile standard (UMTS) is in fact also based on some aspects of GSM and thus similar location technologies to those used with GSM will also be usable with UMTS. The principal positioning technologies available for mobile subscriber device location include the following:

CGI+TA (Cell Global Identity+Timing Advance). This method can determine the distance of an active MS device (i.e. one actively engaged in a telecommunications transmission) from a particular transmitter/receiver base station to an accuracy typically of the order of 550 m (within an annular zone (complete 360° arc) around the base station which has a radial depth of 550 m). The information can also be ascertained by "paging" an "idle" MS device (i.e. one which is switched on but not actively engaged in a call). This method requires no MS device modifications. A base station with multiple directional antennae (which are now common) reduces the location arc to a sector around the base station of, for example, 120°. Further enhancements are planned to increase the accuracy of this method to between 100 m and 200 m.

It should be noted here that with some kinds of network, for example GPRS (General Packet Radio System) networks, an MS device which is switched on but not actually involved in sending any communication to or from the MS, is still in communication (at least periodically) with the call management system for the purposes of managing the network, and accordingly references to "active" MS devices in the context of the broadest scope of the present invention, should be interpreted as including devices in any kind of communication with the call management system.

UL-TOA (Uplink Time-of-Arrival). UL-TOA can determine the location to within 50 m to 150 m, depending upon terrain, by measuring the time taken by the signal from the mobile handset to arrive at multiple "measurement points". In more detail distances from each of these different measurement points is determined from the respective times which can be used to determine the position of the MS device by triangulation.

E-OTD (Enhanced Observed Time Difference). Unlike CGI+TA and UL-TOA, this method places the responsibility for determining location in the MS device, and hence incurs little extra expense for the mobile operator. Essentially this method is the reverse implementation of UL-TOA. The accuracy is similar to that of UL-TOA (about 60 m in rural areas and 200 m in bad urban areas).

A-GPS (Assisted Global Positioning System). GPS is commonly used for navigation systems in cars. GPS technology relies on a network of satellites orbiting the earth and transmitting signals which a receiver unit on the ground can use to calculate its own location. The GSM network can provide assistance that gives increased accuracy over standalone GPS systems by making use of the actual precisely known position of the base stations and comparing these with the base stations as reported by the GPS system in order to generate a correction factor which can be applied to the mobile subscriber device position as reported by the GPS system. The accuracy of this method is extremely high but requires modifications to mobile handsets.

The particular positioning or location method technology used is in many respects unimportant to the implementation of the traffic congestion reporting system of the invention. The common attribute all these methods share is that the location position for each MS may be expressed as being within a given area of uncertainty in whatever form of coordinates etc in which this is expressed. It is the responsibility of the system of the invention to "fit" a series of such readings onto a physical road traffic network and identify those readings which are likely to be in moving vehicles. The mobile telecommunications device network equipment vendors (alongside third party companies) are developing various mobile positioning solutions based on one or more of the above technologies. Most of these companies offer proprietary interfaces but there is an ongoing effort to standardise location or position based services and it is anticipated that this interface will be widely supported. The Ericsson Mobile Positioning Protocol (MPP) has been selected as the basis for the standardisation. This provides an interface with which to query the Ericsson (or other compatible) Mobile Positioning Centre (MPC) in order to extract positioning data for individual MS devices. The MPP hides the particular mechanism which is used by the MPC to locate the MS device which therefore could be based on any of the aforementioned technologies.

The size and form of the area of uncertainty defined by the positioning system or MPC will vary according to the particular positioning system used. In the case of a CGI-TA based MPC individual terrestial mobile telecommunications device network transmitter/receiver stations (including repeater stations) each serve a sector-shaped area radiating out from the station, where the angular spread of the sector may be 360° or any smaller angle, such as for example 120°. The sector may extend several kilometres or more in any given direction depending on the topography of the area around the station. Due to the increased delay experienced in transmission of signals between a station and a MS device as the distance of the MS device from the station increases, the sectors are divided up into a series of annular timing advance zones so that as a MS device moves away from the station, it passes from one timing advance zone to a neighbouring one in which signals are subjected to a different timing correction so that these delays can be compensated for and the signals from various MS devices at different distances from the station are all properly synchronised. Typically the radial extent of each zone is several hundred meters, for example, about 500 meters. At the boundary between adjacent zones (the timing advance boundary) there is generally a small overlap or intersection region which may have a radial extent of the order of 50 to 100 meters. It will of course be appreciated that a vehicle travelling along a road will at some stage also cross over from a timing advance zone of one station into a timing advance zone of a neighbouring station and such transitions are also used in essentially the same way in the method of the invention.

For the purposes of management of calls within the mobile telecommunications device network, the positioning information can simply comprise the identity of an individual base station cell (the geographical area served by an individual base station), and the particular timing advance zone of that cell, within which the MS device is located. Insofar as such positioning information is not in a form which defines geographical position as such in conventional terms such as longitude and latitude or other suitable co-ordinates, but can nevertheless be readily converted into such a form from a knowledge of the actual geographical positional data corresponding to the particular timing advance zone, such positioning information may conveniently be referred to as proto-geographical positional data. The conversion of such proto-geographical positional data into geographical positional data could be carried out by means of suitable additional processing at the positioning system, or alternatively at a computer system of the present invention which is disposed separately or remotely from the positioning system.

The road network data used in the method of the present invention is generally in the form of a data file which can be more or less easily operated on mathematically. One convenient readily available and adaptable data file format is GDF (Geographic Data File) in which road networks are stored in the form of nodes representing junctions and edges representing each carriageway or road direction between neighbouring junctions. This particular data file format has the advantage that it can include information on the classification of roads i.e. distinguishing between motorways and other major or trunk roads and minor roads, which can be used as a basis for weighting such roads when constructing a probability vector for a vehicle on the basis that there will generally be a greater likelihood that a vehicle is travelling along a major road than a minor road where both of these cross the timing advance boundary under consideration and would have been available for use by the vehicle.

As noted hereinbefore, the particular positioning technology used to obtain the geographical positional data used in the present invention does not significantly affect the mode of operation of the invention. For the purposes of ease of illustration and understanding, the principal data processing steps will now be described in more detail with reference to one preferred form of the invention wherein is used the CGI+TA positioning method in which the geographical areas defined by the captured geographical positional data correspond to individual timing advance zones of individual (transmitter/receiver) base stations. (In fact as explained elsewhere herein, in the first instance there is captured proto-geographical positioning data comprising the base station and timing advance zone identities which are then intersected with base station and timing advance zone mapping data so as to provide the geographical area coordinates constituting the geographical positional data). It will be appreciated that in the case of other positioning technologies, the timing advance zones used in this particular case (using CGI+TA) will be replaced by the geographical areas as defined by the geographical (or proto-geographical) positioning data captured for the active MS device. In the case of the PCS (Personal Communications System) mobile phone networks widely used in the USA, timing advance zones are not used and the basic geographical positioning information used in the system is simply the identity of the cell within which the MS is located at the time (i.e. the positioning technology effectively is CGI without TA). Although the positional information with this system is generally less precise, it can nevertheless be quite practicable for major highways where the cells are relatively small (e.g. around 4000 meters across and smaller) which is in fact often the case with freeways in urban and suburban areas, which are precisely the areas where delays are more likely and where there is a greater demand for traffic delay reports. Of course where such (PCS and other non GSM) networks are provided with dedicated positioning technologies such as UL-TOA, E-OTD, or A-GPS, then these would normally be used to capture the geographical positional data.

The generation of the probability vector representing the likelihood of the vehicle having arrived at a position on a given one of the possible road components for all of the possible road components may be effected using any suitable criteria. Generally these will include the classification of the road and desirably also the length of the road within the timing advance zone, of which road the possible road component forms a part (where the road component is restricted to part of an individual road). The length of the road within the timing advance zone may be obtained from an intersection of the timing advance zone mapping data with the road network mapping data. As used herein the terms "intersection", "intersecting" etc. indicate any suitable process or procedure by means of which one type of data is compared with another type of data in order to determine the correlation therebetween. Thus for example a comparison of the geographical co-ordinates of a given timing advance zone may be compared with geographical co-ordinates of various road components in the network in order to determine which road components fall within or at least partially overlap that timing advance zone. The weighting assigned to different classifications of road is essentially arbitrary but could typically be as follows: motorway or freeway=10, major road or highway=8, and minor road or country road=2. The probability for the vehicle being on each one of the available roads is then determined by the product of the selected criteria, e.g. length of road ×classification weighting.

Using the CGI+TA positioning system, the geographical positional data is generally captured when the device crosses a timing advance zone boundary between one timing advance zone and a neighbouring timing advance zone. Thus the system initially generates a probability vector when a vehicle carrying an active MS device crosses a first timing advance zone to a second timing advance zone. When the vehicle (MS device) crosses a second timing advance boundary from the second timing advance zone into a third timing advance zone, the system constructs a transition matrix representing all possible routes that could have been taken to get from the first timing advance boundary to the secondtiming advance boundary. For each route a probability is calculated as before. In addition an expected transit time is calculated based on the length of the road from the first timing advance boundary to the second one and the standard speed of the road classification concerned (modified if required by any special speed limit applicable). The actual transit time between the crossings of the first and second timing advance boundaries, may then be compared with the calculated expected transit times to provide an additional probability factor based on the fact that it is significantly less likely that the actual transit time will be substantially less rather than substantially more than the calculated expected transit time. This additional probability factor may then be applied to the transition matrix to produce a time dependent transition matrix, which can in turn be applied to the original probability vector to provide an updated probability vector representing the likelihood of the vehicle having arrived at a position on a given one of the said new possible road components. Thus, for example, where one (or more) of the originally available routes is absent from the time dependent matrix, then this can now be excluded from the updated probability vector. In addition it can also be excluded from the original (or previously updated) probability vector(s) thereby providing a more accurate historical record of the immediately preceding positions.

The information collected on the progress of the vehicle, in terms of its routing as provided by the updated probability vectors and its rate of progress as represented by its actual transit times, can now be combined with that for the other vehicles found to be using the same road component, to provide an average speed for that road component immediately before the latest average speed determination (typically within a time frame of less than a minute). Advantageously the average is skewed to provide increased weighting for faster moving vehicles as these will be more representative of the maximum available rate of progress on that road—and hence the degree of congestion thereof, at the time. The degree of congestion is determined by comparing the calculated average with a normal (uncongested condition) average speed, to provide a delay factor indicating the degree of congestion on any convenient scale, such as a numerical or percentage scale.

It may be noted that how up-to-date the average speed determinations and delay factor reports are, will depend on the frequency with which geographical positioning data can be captured, which in turn will depend on the positioning system used. Thus, for example, where the CGI+TA positioning system is used, geographical positioning data is captured when a vehicle carrying an MS device crosses timing advance zone boundaries. Accordingly the greater the separation between these and the slower the vehicle speed, the longer the interval between the capture of the geographical positioning data, and in practice such intervals can typically range from less than one minute to several minutes or more. With other positioning system, such as, for example, A-GPS, geographical positioning data may be capturable rather more frequently and/or more regularly, for example, at a fixed interval in the range from 5 to 30 seconds. As noted elsewhere herein, average speed (or transit time etc) determinations are generally carried out for all vehicles which have passed along a road component of interest during a period of some minutes immediately before the determination, with suitable ageing (as further discussed hereinbelow) of increasingly older data used in the determination, and such determinations may be repeated at any convenient interval for example, from 1 second to 1 minute. (Alternatively, the system could be formed and arranged so that determinations are only carried out on-demand, as and when a user actually interrogated the system for particular road delay factor information). How up-to-date the reports received by the user are, may thus be a function of a number of factors such as the manner and frequency of generation of reports and the positioning system used.

It will of course be appreciated that the transit times and road delay factors may be utilised and/or presented in various different forms. Thus, for example, the transit times may be used directly or they could be used indirectly by being converted into speeds by dividing the distance travelled between the first and second road positions by the transit time $\Delta t$. The delay factors can be determined by comparing actual transit times with expected transit times, or could be determined by comparing actual speeds with expected speeds. The delay factor may be presented to the end user in various different ways which may be qualitative and/or quantitative. Thus, they could simply be presented descriptively and/or graphically, for example, by colour coding roads suitably in a visual display of the road network—with green for no significant delays, amber for moderate delay, and red for serious delay, each level corresponding to a particular range of delay factors. Where the delay factors are presented quantitatively these could be in the form of numerical or graphical (e.g. bar) representations of a percentage speed reduction, a time delay, or any other convenient form.

Where it is desired to provide an indication of congestion in terms of an estimated delay time, then this could be indicated by the product of the difference between the calculated average speed and the normal average speed, and the total length of the road (possibly several successive road components) affected by the congestion. In practice, though, given that the system works primarily on transit times, it would usually be more convenient to derive estimated delay times based on comparisons of actual and estimated transit times.

By counting all the vehicles found to be using a particular road component, it is also possible to estimate the volume of traffic on the road (based on a typical proportion of vehicles carrying an active MS device using the mobile telecommunications device network at a given time). This information can then be used, if desired, optionally with other additional information such as time of day or night, weather conditions etc, in order to further refine the calculations used in the method of the invention. Thus, for example, the composition of the traffic in the middle of the night is likely to have a higher proportion of heavy goods vehicles (which are subject to lower speed limits than other vehicles) than during the day, which would result in the calculated average speed being biased downwardly. Accordingly the expected average speed used for comparison purposes at such times could be adjusted. Alternatively the expected average speed could be kept unchanged, and the weightings used in the calculation of the average speed at such times could be modified.

Most of the time for most road components there will be no significant congestion or delay factor present and therefore no particular interest in the calculated delay factors. Advantageously therefore the system of the present invention includes an algorithm for continuously monitoring the calculated delay factors for the presence of any which are greater than a predetermined threshold resulting in a delay of greater than say 10 minutes and selectively producing only reports for the roads concerned. The reports may be made available in a generally known manner through any suitable interface, including synthetic voice reports, graphical representations, conveniently superimposed on road map graphics, for display on suitable MS device display screens, text reports for transmission via SMS (Short Message Service), HTML (HyperText Mmarkup Language) and WML (Wireless Markup Language) format reports for uploading onto HTTP (HyperText Transport Protocol) and WAP (Wireless Application Protocol) servers for accessing via the Internet and over the air, cell broadcast message format for transmission via CB (Cell Broadcast) Centres, etc.

In order to enable the retrieval of reports of interest to the user, the user interface is generally provided with a query interface for interrogating the current road delay factor status database. In general, the query interface would be formed and arranged for enabling the user to request one or more of: delay by geographical area, delay by road number, and delay by place name e.g. town or village name. The query interface could, moreover be automated to a greater or lesser degree—for example, in the case of MS device within a given base station cell, the query interface could be formed and arranged to detect the cell identity (and hence geographical area) of that cell and then automatically generate suitable delay reports for roads within or crossing through that cell.

In general road traffic networks are represented in geographical data files as a series of road segments connected to each other at nodes which represent road junctions. The road segments are often rectilinear (to simplify and reduce the volume of data required). In the case of relatively long road segments corresponding to substantially non-rectilinear roads, then these may be broken up be using one or more pseudo-nodes between the actual nodes in order to enable the geographical data file representation of that road to follow more closely the actual geographical position of the road. Even so, the distance between neighboring nodes or pseudo-nodes may still be too great (especially in the case of motorways or freeways, or other major highways in open country) and in such cases it will generally be desirable for the purposes of the present invention to break up the road segments into shorter lengths allowing more accurate processing and monitoring of vehicle position and speed data. Given the typical speeds of vehicles in the road network and the levels of accuracy typically required for traffic delay or congestion reports, there is no particular advantage in making the road length units used in the method of the invention too small, and in general a suitable maximum length would be in the range from 200 m to 2000 m, preferably from 300 m to 1000 m, for example about 500 m, for the road segments used as road components in the methods and apparatus of the invention. Thus, for example, if a road segment in the geographic data file was greater than 500 m, then the data would be modified by breaking that segment up into shorter units, each of not more than 500 m length.

Conversely in the case of urban and sub-urban areas with relatively dense road networks, in which many of the roads are not significant "through routes", there will be very large numbers of very short road segments. In order to simplify and reduce the processing load it may be desirable in such cases to treat several road segments as part of a single unit for processing purposes. Advantageously in the present invention there is used a geographical data file in which the road network data is modified so as to represent the roads in the form of units or "road components" of a length and or extent suitable for use in the method of the invention. Thus in the context of the present invention, a "road component" may be any one of an actual length of road joining two junctions, part of such a length of road, and a group of interconnected roads.

It should be further noted that in the case of freeways and other major highways with two (or more) separate carriageways, each of these carriageways is normally represented as a separate road segment and thus would automatically be treated as separate road components, whilst in the case of single carriageway roads these are normally represented as single road segments. In order to be able to monitor differences in traffic flows in each direction along bi-directional single carriageway roads, it is therefore necessary to. modify the geographic data files used so as to provide duplicate road segment units—one for each direction—for use as the road components in the methods and apparatus of the invention.

For the avoidance of doubt references herein to "possible" road components are used to indicate all road components the geographical co-ordinates of whose extent fall within or overlap the geographical co-ordinates defining the extent of the geographical area defined by the geographical positional data which has been provided by the positioning system, i.e. all road components having geographical co-ordinates consistent or compatible with those of the geographical positional data. "Original" possible road components are such possible road components which have been identified for a first (or immediately preceding) captured geographical positional data, and "new" possible road components are those identified for a second or newly captured geographical data.

In addition to providing a continuous reporting service, the system of the present invention can also be programmed to search the database for road delay factors above a predetermined threshold and outputting general alerts to broadcast type interfaces such as radio stations, web sites etc.

In another aspect the present invention provides a road traffic network congestion reporting system suitable for use in conjunction with a mobile telecommunications device network having a call management system provided with a mobile telecommunications device positional data transmitting system, for monitoring and reporting on road traffic delays affecting the movement of vehicles through the road network, said reporting system comprising:

a storage device, and a processor connected to said storage device; and the storage device storing:

i) road network data representing the geographical position of road components making up said road network;

ii) expected vehicle speed data for individual parts of said road network; and iii) a program for controlling the processor;

said processor operative with the program to:

It will be understood that the physical location and/or configuration of the computer system used in the present invention may have various different forms. Thus it may be substantially remote from the call management system and connected thereto in a WAN (Wide Area Network) or simply by any suitable telecommunications channel. Alternatively the apparatus could be coupled to the call management system through a LAN (Local Area Network), or even substantially integrated with the call management system computer.

In a further aspect the present invention provides a computer program product comprising:

a computer usable medium having computer readable code means embedded in said medium, said computer readable code means comprising a report generator for monitoring vehicular traffic flow in a road network and providing reports on congestion on individual roads in said road network, said report generator comprising executable program code for execution by a computer coupled with a mobile telecommunications device network having a call management system provided with a mobile telecommunications device positioning system providing positional data in respect of at least active mobile telecommunications devices belonging to said mobile telecommunications device network, wherein said executable program code:

a. captures geographical positional data for an MS mobile telecommunications device;

b. intersects said geographical positional data with road network mapping data defining said road network in terms of road components each representing a discrete part of the road network, so as to identify possible road components corresponding to said geographical positional data;

c. generates a probability vector representing the likelihood of said vehicle having arrived at a position on any of said possible road components;

d. identifies available routes in the road network linking said possible road components corresponding to a given geographical positional data and a preceding possible road components corresponding to a preceding geographical positional data, which routes are constituted by a series of road components;

e. intersects said available routes with expected average vehicle speed data for the road components of said series of road components constituting said available routes so as to determine expected transit times for said available routes;

f. directly or indirectly compares the actual transit time with the expected transit time for each of said available routes so as to produce delay factors for said routes indicative of the degree of vehicular traffic congestion on the individual road components thereof at the time; and g. determines an average delay factor for a plurality of vehicles using a given road component, which average is weighted on the basis of at least the likelihood of a given available route having been followed.

BRIEF DESCRIPTION OF THE DRAWINGS

Further preferred features and advantages of the invention will appear from the following detailed description given by way of example of some preferred embodiments illustrated with reference to the accompanying drawings in which.

DETAILED DESCRIPTION OF THE INVENTION

Figure 1:
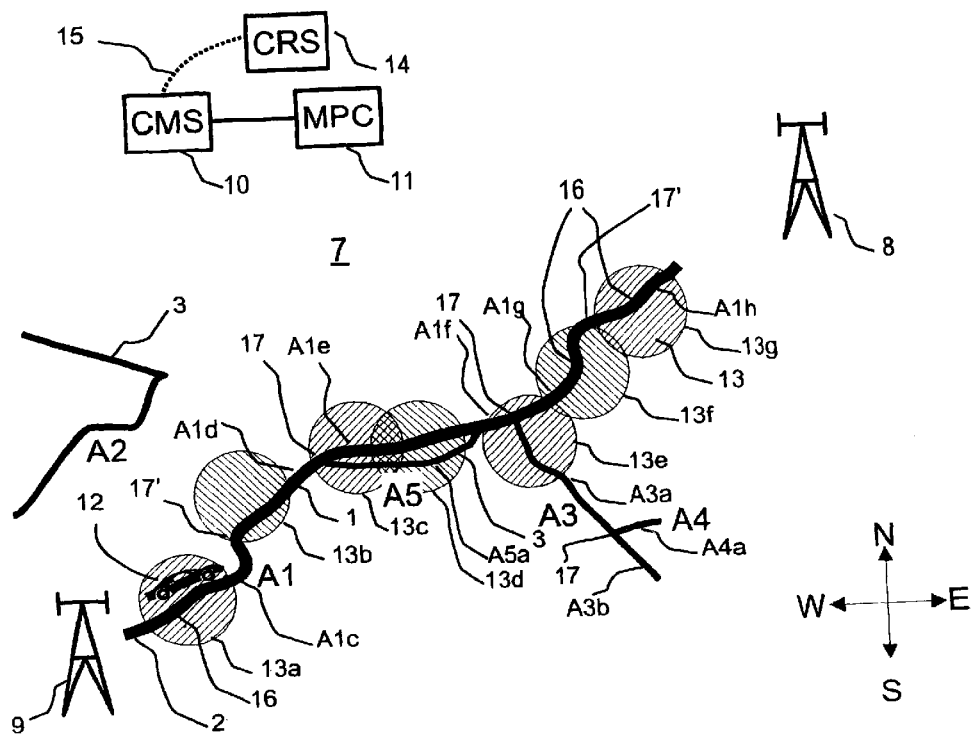
FIGS. 1 and 2 each showing part of a road network and its relationship to a part of a mobile telecommunications device network.

FIG. 1 shows part of a road network 1 (not to scale) comprising a major highway 2 which has the name A1, and various other minor country roads 3, with the names A2, A3, A4, A5 in an area served by a mobile telecommunications device network 7, including a plurality of transmitter/receiver stations 8, 9 and a call management system 10 provided with a mobile telecommunications device geographical positioning system or centre (MPC) 11, for example, one based on global positioning system (GPS) technology.

When a motor vehicle 12 is driven along highway A1 with a cell phone or other mobile telecommunications device (MS device) aboard in use, the positioning system 11 will periodically generate geographical position data for the device. These data are in the form of a more or less extended geographical areas, depending on the precision of the particular positioning system used, which areas are represented in FIG. 1 by shaded cells 13 (13a, 13b etc) with typically a diameter of around 20 meters. This geographical position data is intersected with road traffic network data representing the geographical position of individual road components 16 (A1c–A1h, A3a, A3b etc) of each of the roads A1, A2 A3 etc by a congestion reporting system (CRS). 14 of the present invention. The individual road components 16 (A1c, A3a etc) generally consist of lengths of a road 2, 3 extending between successive junctions 17 with other roads 3, 2 which constitute nodes in the database comprising the road network mapping data representing the geographical position of the individual road components 16. Where the length of road 2, 3 between successive junctions 17 is too long, then this may be broken up by inserting additional nodes 17' to divide the road into road components each of which has a length not greater than say 500 meters. Thus at the SW end of road A1 an additional node 17' is used to break the road 2 up into two road components A1c and A1d.

It should incidentally be noted that although for ease of illustration and clarity, the Figures show each road segment as just one road component e.g. A1c, in practice such road segments would normally each correspond to two road components e.g. A1c' and A1c", with one for each direction of travel along the road. Naturally this affects the amount of processing involved insofar as, at least for an initial geographical position, twice as many road positions have to be taken into account since it will not be known in which direction the vehicle is travelling. Once a second geographical position has been captured, though, it will become evident that the second road positions can only be linked to the first road position(s) by a route(s) using those road components heading in one direction and not in the other direction, whereby the latter can be discarded from the road components under consideration.

The congestion reporting system 14 is coupled 15 to the call management system 10 (as further described hereinbelow). The system 14 recognizes which road components 16 of the road network 1 correspond to (are consistent or compatible with) the geographical position data received for the vehicle 12. In some cases the geographical position data 13a, 13g will be compatible with only one possible road position i.e. a particular road component 16—A1c, A1h, respectively—of the A1 highway. In other cases the geographical position data 13c, 13e would be compatible with the vehicle being on any one of two or more different road components 16. In one case parts of highway A1 (road component A1e) and minor country road A5 (road component A5a) are present within the geographical area defined by geographical position data 13c, and in the other case different parts of highway A1 (road components A1f, A1g) and minor country road A3 (road component A3a) are all compatible with geographical position data 13e.

The congestion reporting system 14 presents the road position data for such cases as a probability vector which comprises the relative probabilities of the vehicle 12 being on one or other road component (see further description hereinbelow). The probabilities may be based on one or more suitable factors such as, for example, the length of the road within the geographical area under consideration and the classification of the road. In the case of geographical area 13e highway A1 has a higher classification than minor country road A3 and thus A1 road components have a higher probability rating than road component A3a. On the other hand the length of road component A3a within geographical area 13e is greater than that of each of road components A1f, A1g which would tend to weight the probability of the vehicle being on one or other road component in the other direction, albeit that in this particular case the difference in classification might still be expected to outweigh the difference in road length. Where only a single road component (e.g. A1h) intersects with the geographical position data (13g) it will be appreciated that the relevant part of this road has a probability of 100% or 1.

Once a moving MS device which is "active" (i.e. in use for sending and/or receiving some kind of MS telecommunication—or simply exchanging data with the call management system 10 for network management purposes) has been detected, that is to say one in a moving vehicle 12, then this can be tracked for the duration of the period in which it remains active. The second (and subsequent) road position data (13b–13g) can be generated for it by intersecting the geographical position data with the road network mapping data as before and then carrying out additional processing as described hereinbelow.

A probability vector representing the second road position 16 (A1d) is generated by means of constructing a transition matrix representing each of the available routes between the first and second road positions 16. In some cases such as the road components A1c→A1d corresponding to geographical positions 13a, 13b, respectively, there will only be a single route A1c→A1d available. In other cases such as road components A1d, A1e, A5a corresponding to geographical positions 13b, 13c, there will be more than one route available (A1d→A1e or A1d→A5a). Thus with a vehicle travelling from geographical position 13b to geographical position 13c it starts off on the highway A1 but ends up either remaining on highway A1 or driving onto minor country road A5. Thus there are two possible routes available compatible with the first and second geographical positions detected.

Once there has been produced the transition matrix representing the likelihood of either of these available routes having been followed on the basis of the road position data (the likelihood of the vehicle being on any particular road at the time), this transition matrix is then further refined by taking into account the actual transit time $\Delta t$ of the vehicle between the first and second road positions. The congestion reporting system 14 also holds data relating to the expected speed of travel along a particular road component. This may be based simply on the classification of the road, for example, 60 mph for a highway and 35 mph for a minor country road, or may take into account predetermined additional factors such as time of day, day of week, or may even involve live updating where, for example, the average road traffic speed has been reduced somewhat during a given period due to volume of traffic but the road has not been subjected to any particular incident or circumstance which would actually disrupt the flow and prevent the traffic from flowing at a reasonably steady rate. By comparing the expected vehicle transit time $\Delta t_x$ between the first and second road positions there may then be generated a time dependent transition matrix representing the likelihood of the vehicle having travelled along a particular route. Thus, for example, if the expected transit time for the vehicle between a first road component A1d and a second road component A1e (following highway A1) was 42 seconds and for a second road component A5a (going from highway A1 onto minor country road A5) was 58 seconds and the actual time was 50 seconds then it may be seen that the actual time was slower than that expected for the first route but significantly faster than that expected for the second route. Given that it is generally significantly less likely that a vehicle would go much faster than the expected speed, than that it would go slower than the expected speed, the congestion reporting system 14 would adjust the initial transition matrix to increase the probability of the route A1d→A1e remaining on main highway A1 relative to that of route A1d→A5a turning off onto minor country road A5.

For the purposes of determining expected transit times, it is of course necessary to know what distance has been travelled. In the case of geographical position 13c it may be seen that, at the time this position 13c was captured, the vehicle could have been positioned anywhere in the first half of road component A1e (or A5a). In the case of geographical position 13b the vehicle could have been at the (NE) end of road component A1c or anywhere in the first half of road component A1d. In order to facilitate the calculation of the expected transit time $\Delta t_x$ the system makes a standard assumption each time such as that the vehicle is at the earliest part of the (or each) road component 16 with which the geographical position 13 is compatible.

It will be appreciated that as the probability of the vehicle following one route rather than another is increased, then this can be used in order further to refine the vectors representing current road position and transition matrices representing routes leading thereto, iteratively. Thus, for example, if the time dependant matrix were to indicate that there was a high probability that a particular vehicle was following a route A1d→A1e staying on highway A1 rather than a route A1d→A5a turning off onto minor country road A5, then this could be used to refine not only the updated second probability vector derived from geographical position 13c, but also the earlier generated first probability vector derived from preceding geographical position 13b.

For example, geographical position 13b is consistent with the vehicle 12 being on either of road components A1c or A1d. The former possibility would imply a greater travel distance and hence higher speed for a given transit time. If this higher speed were significantly greater than the expected speed then this would substantially reduce the probability of the vehicle being on road component A1c and increase that of the vehicle being on road component A1d, thereby increasing the probability of route A1d→A1e being followed and decrease that of route A1c→A1e.

When a probability vector representing the relative likelihood of the possible road component positions 16 at a given time and the relative likelihood of any of the available routes to the respective road component positions having been followed (after filtering out low probability routes), has been generated, then the routes may be split up into their road component segments, each representing a given length of a particular road, and the actual transit time for the route distributed across the component road segments (in proportion to their lengths and expected road speeds), and the congestion reporting system 14 generates expected transit time reports for the particular vehicle under consideration for each component road segment. Preferably, though, the congestion reporting system 14 generates an expected transit time $\Delta t_x$ for the whole route by summing expected transit times for each of the individual road components thereof, and then divides this into the actual transit time $\Delta t$ detected to produce a delay factor for the whole route. Whilst the delay factor could in principle vary between the different road components included in the route—for example, when turning off a congested highway onto a minor road, for most practical purposes it may conveniently be assumed that the (same) delay factor applied equally for each of the road components included in the route.

The congestion reporting system 14 then averages the delay factor reports generated for all available vehicles (i.e. those carrying an active MS device using the mobile telecommunications device network 7) for a given road component to obtain an average delay factor for the particular road component. The delay factor reports used for this could simply be generated at the time, but more commonly would include at least some earlier reports which have been suitably aged or decayed to reduce their weighting in the averaging process. Thus for example the weighting of earlier reports could be decayed at a linear rate of 10% per minute for a busy road and 5% per minute for a quiet road. The average delay factor thus obtained gives an indication of the delay (if any) to which vehicle traffic on that road component is being subjected to at the time and hence the status or degree of congestion of the road network thereat.

Figure 2:
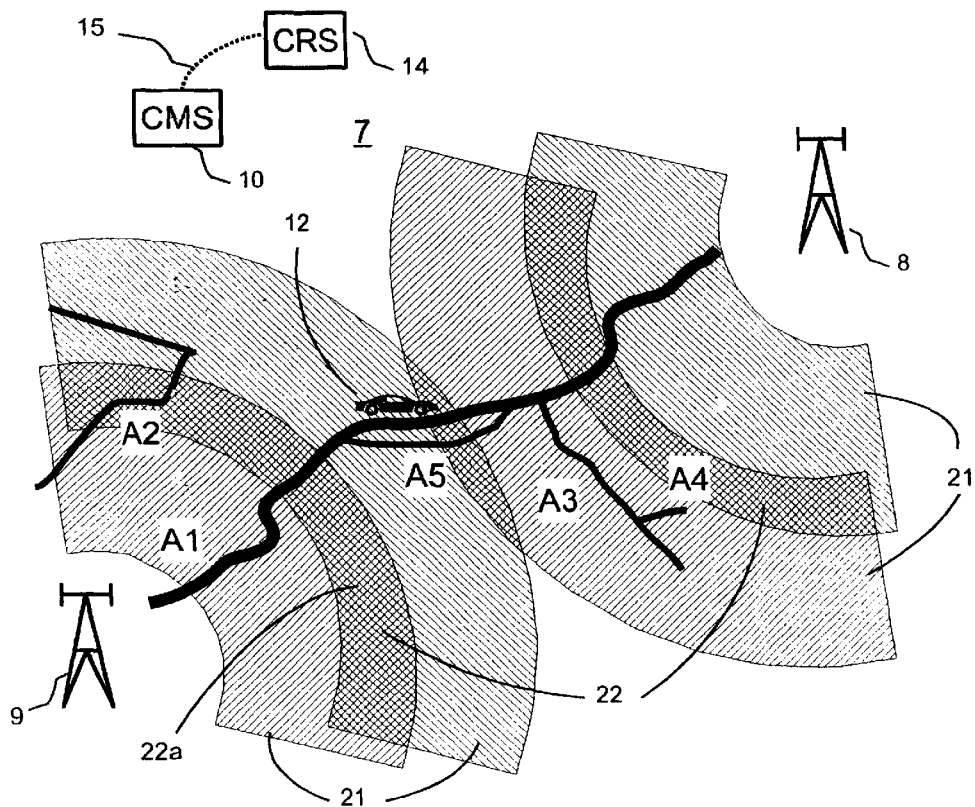

FIG. 2 illustrates the use of another kind of system for generating geographical position data in the same road network 1. In this case the call management system 10 does not have a dedicated geographical positioning system but instead the congestion reporting system 14 makes use of an integral component of the call management system 10.

In more detail, the call management system 10 in FIG. 2 depends on the use of timing advance zones for managing the receipt and transmission of calls between the MS devices and the transmitter/receiver stations 8, 9. Thus when the call management system 10 detects an active MS device (i.e. one which is in use) it continually monitors which timing advance zone the device is in. These timing advance zones are in the form of part annular zones 21 which have a limited overlap with neighbouring zones at which a timing advance, to which the MS device is subject to, is incremented or decremented. When an active MS device (on board the vehicle 12) enters the overlap area the device may operate with a timing advance under either the first or second timing advance zone. Thus the device may switch from the first timing advance to the second timing advance at any point within the overlap area (conveniently called the timing advance boundary zone) between the first and second timing advance zones—and indeed could flip back and forth until it leaves the overlap area and clears the first timing advance zone entirely. In principle, when the MS device switches from the first timing advance to the second one, all that the call management system knows is that it is at a position somewhere within the second timing advance zone, which position may be within or outside the overlap area. In practice given the very short time intervals (typically 0.5 seconds) between successive captures of geographical positioning data, we will know that when a timing advance switch has been detected, the device would definitely have been within the overlap zone some time during this short time interval, and by substituting a limited degree of timing uncertainty for a greater degree of positional uncertainty, can assume that in the case of geographical position captures occurring when a timing advance switch is detected, the MS device is within the limited overlap area (timing advance boundary zone) rather than the whole of the new timing advance zone. As may be seen from FIG. 2, the geographical area of even the more limited timing advance boundary zone 22 may still be considerably larger than the geographical area 13 defined by the GPS system used in FIG. 1 and thus will often contain a larger number of road components so that the geographical positioning data obtained will be compatible with a greater number of road component positions.

It can also be seen that the geographical areas are usually larger, so the transit times determined (between different road component positions), are rather longer. This will clearly have a negative effect on the probabilities attributable to the various possible road positions and available routes therebetween, so that there will generally be less confidence in individual identifications of likely road positions and routes. Nevertheless, in principle, the congestion reporting system 14 operates in a substantially similar manner to that described hereinabove, comparing expected transit times with actual transit times, and determining average delay factors for individual road components.

Figure 3:
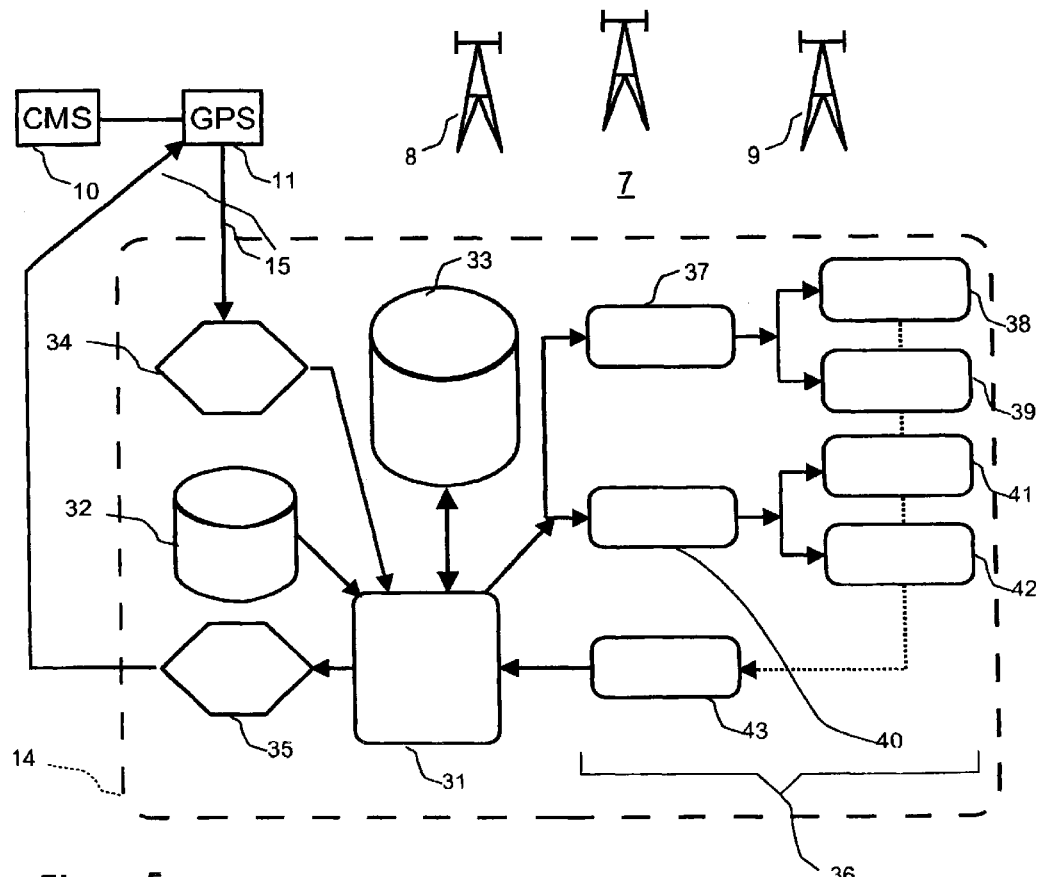
FIG. 3 is a block diagram showing the principal parts of a traffic monitoring system of the present invention.

FIG. 3 shows the principal parts of a typical congestion reporting system 14 in use with a mobile telecommunications device network 7 having a call management system 10 provided with a geographical positioning system 11. The congestion reporting system 14 essentially comprises computer processor means in the form of a distributed processing engine 31 provided with data storage means 32, 33 for storing read-only data such as a geographical data file containing a digital representation of the road network and details of the road classifications; and for storing read/write data such as probability vectors representing current and historic vehicle road position and route data, and expected speed data for the various roads in the network. The congestion reporting system 14 also includes data collection interface means 34, 35 connected 15 to the geographical positioning system 11 for receiving geographical position data for MS devices and requesting updates of this for MS devices carried on individual vehicles; and reporting interface means 36 for providing road traffic congestion reports to the outside world.

In more detail the reporting interface means 36 generally comprises a text converter 37 for providing reports to a voice gateway 38 or SMSC (short message system centre) gateway 39 and a graphics converter 40 for providing reports to a WAP gateway 41 or HTTP gateway 42, and a query control input 43 for forwarding report requests from the various gateways 38, 39, 41, 42 to the processor 31.

Figure 5:
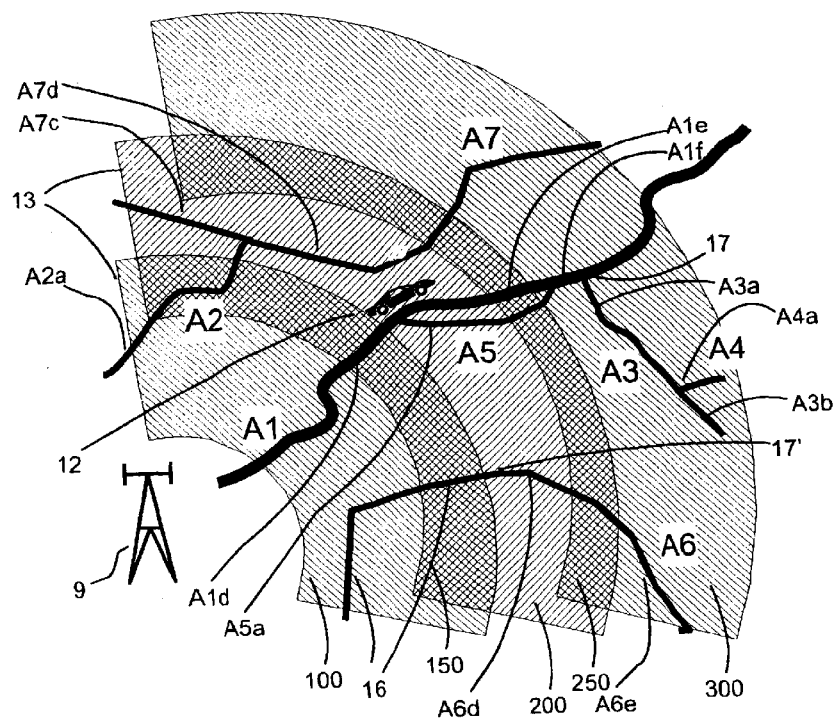
FIG. 5 shows another part of a road network and its relationship to a part of a mobile telecommunications device network.
Figure 4A:
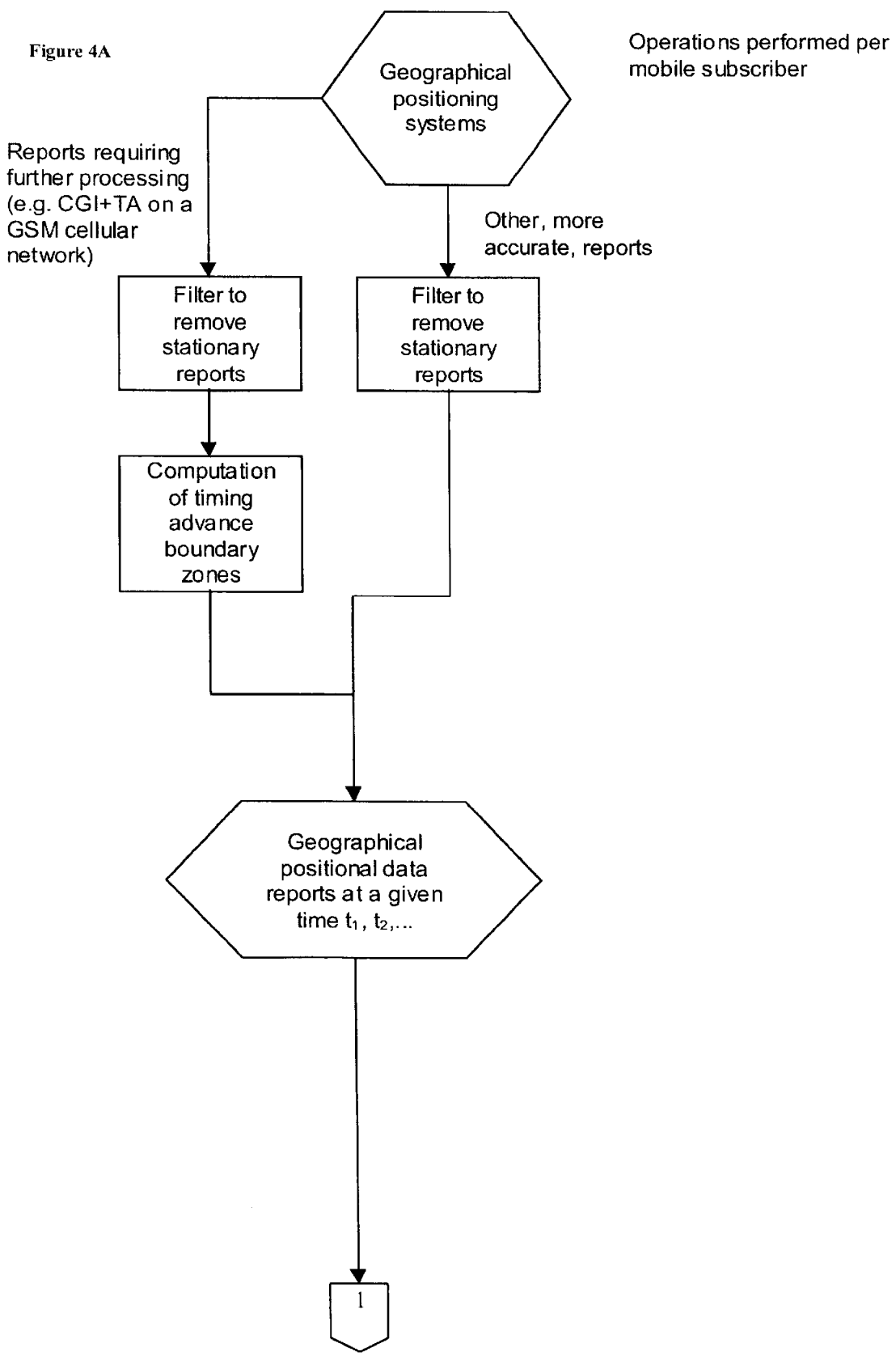
FIGS. 4A–C is a flow chart representing the principal steps of a traffic monitoring method of the invention.
Figure 4B:
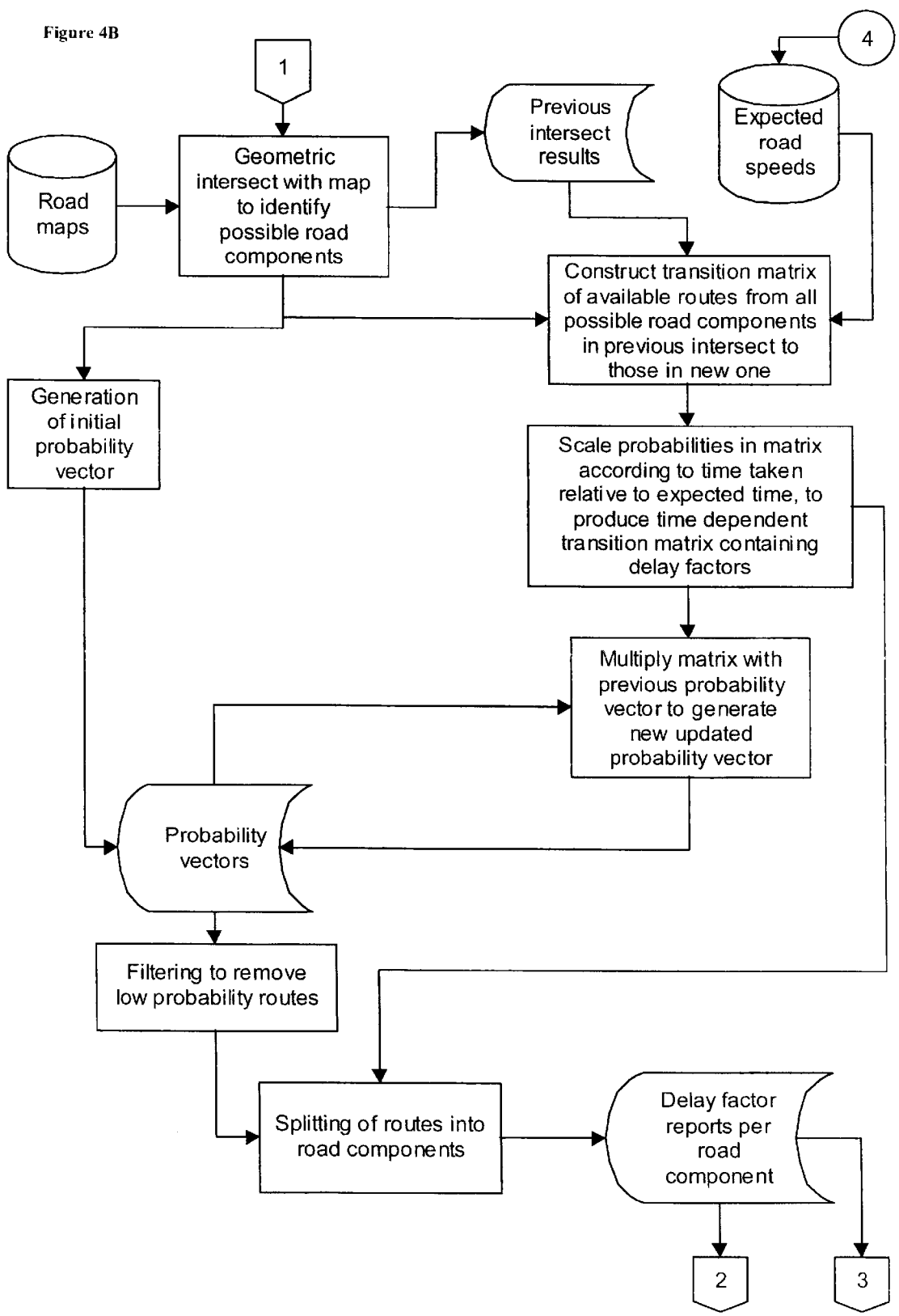
Figure 4C:
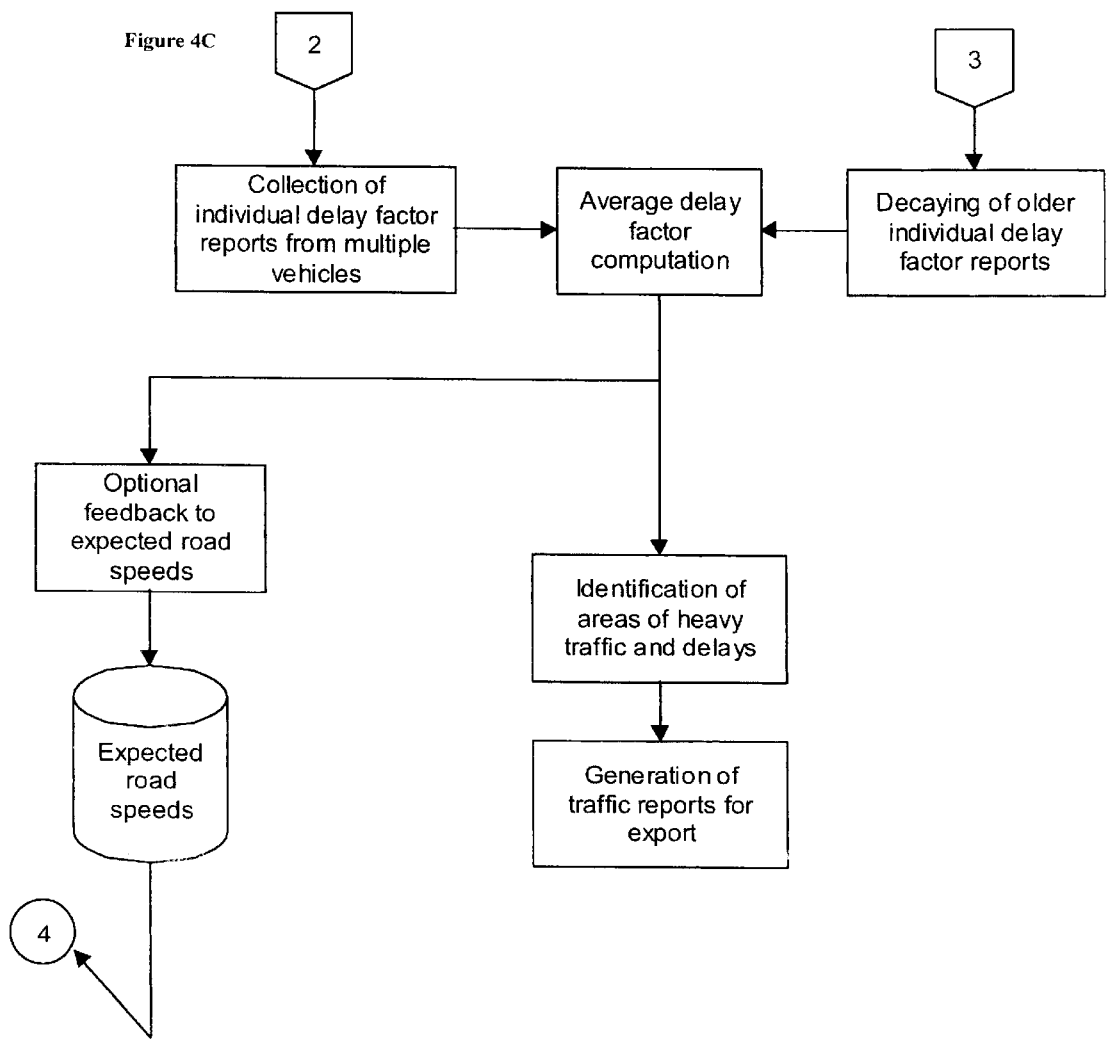

FIGS. 4A–C is a flow chart representing the principal processing steps of a traffic monitoring method of the present invention, FIG. 5 shows another part of a road network in an area served by a mobile telecommunications device network of the same type as in FIG. 2 in which elements corresponding to those in FIGS. 1 and 2 are indicated by like reference numbers. The operation of the process illustrated in the flow chart of FIG. 4A–C will now be considered in more detail with reference to the case illustrated in FIG. 5.

EXAMPLE 1

Use of Traffic Monitoring System

When the vehicle 12 originally within the geographical position 16 defined by timing advance zone 100 is observed to enter the geographical position defined by timing advance zone 200, at time $t_1$, the initial probability vector $V_1$ is constructed for all of the possible road components that the vehicle could be on—in this case those that lie in the timing advance boundary zone labelled 150—see earlier discussion with reference to FIG. 2. (The system only begins capturing geographical positional data reports for an MS device when it detects that it has changed position from its previous position and thus is moving, thereby filtering out reports for stationary subscribers who are unlikely to be in a vehicle driving along a road.) The initial probability vector $V_1$ would have the following form:

| "Route" | Probability |
|---|---|
| → A2a | 0.3 |
| → A1d | 0.4 |
| → A6d | 0.3 |

Note that the probabilities are skewed by the type of road: major roads or highways have higher probabilities.

At time $t_2$, the vehicle 12 is observed to cross from timing advance zone 200 to timing advance zone 300. To construct the transition matrix A for determining the updated probability vector $V_2$ representing the new position of the vehicle 12, the set of all possible routes from timing advance zone 100 to timing advance zone 300 via timing advance zone 200 is determined by use of a route finding algorithm. Each route consists of a starting point on the inner edge of timing advance zone 200 (i.e. the edge closest to base station 9), a set of road components within timing advance zone 200, and an ending point on the inner edge of timing advance zone 300. The expected time taken to get from starting to ending point and the probability for each route are also calculated:

| Route | Expected time (seconds) | Probability |
|---|---|---|
| A2a→A7d | 55 | 1 |
| A1d→A1e | 23 | 0.8 |
| A1d→A5a | 32 | 0.2 |
| A6d→A6e | 35 | 1 |

Note how the expected time for the route taking only road A1 is much less than the routes using the more minor roads. The probability column represents the probability of using a particular route, given a particular starting point. Hence the A2a→A7d and the A6d→A6e routes are both given (initial) probabilities of 1, as there is only one possible route that could be taken given those starting points, but the two routes involving road A1 have different probabilities based on the type of road (higher for road A1, lower for road A5), and given that the total (initial) probabilities of all the routes starting on A1 will be 1, then the probabilities for each of these (A1d→A1e and A1d→A5a) will be less than 1.

The transition matrix A can be cached for future use for vehicles in a similar position thereby reducing the computational processing load, as the transitional matrix is expensive to calculate. To use it in this case, it is first converted to a time dependent transition matrix. For each route, the actual transit time $\Delta t$ is compared to the expected transit time $\Delta t_x$ to provide a delay factor which is also used to adjust the probability of the route. Those routes with expected transit time $\Delta t_x$ significantly longer than the actual transit time $\Delta t$ have their probabilities reduced to reflect the fact that it is unlikely that drivers in general will travel at substantially above the speed limit. (A suitable formula would be a linear reduction of probability to zero for increased speed above the expected speed up to a speed which is double the expected speed.) Hence for an actual transit time of 30 seconds, the time dependent transition matrix $A_{30}$ would look like this:

| Route | Delay Factor ($\Delta t/\Delta t_x$) | Probability |
|---|---|---|
| A2a→A7d | 0.55 | 0.65 |
| A1d→A1e | 1.3 | 0.8 |
| A1d→A5a | 0.94 | 0.15 |
| A6d→A6e | 0.85 | 0.9 |

The updated probability vector $V_2$ is given by the product of the initial probability vector $V_1$ and the route probability from the time dependent transition matrix $A_{30}$. This is then normalised such that the sum of the probabilities is 1.0. (In more detail $V_2$ is generated from the time dependent transition matrix by multiplying the probability for each route by the probability of being at the starting point for that route as obtained from the previous (immediately preceding) probability vector $V_1$, this process being repeated iteratively.)

| Route | Probability before norm. | Probability after norm. |
|---|---|---|
| A2a→A7d | 0.2 | 0.24 |
| A1d→A1e | 0.32 | 0.38 |
| A1d→A5a | 0.06 | 0.07 |
| A6d→A6e | 0.27 | 0.32 |

It is now assumed that the delay factor for a route applies equally to each of the road components of that route. Thus from time dependent transition matrix $A_{30}$ we have a delay factor of 0.55 for a road component A2*a* and 0.55 for A7*d*. The reporting system 14 then generates a weighted average delay factor for each road component using all the available data for different vehicles. The average is weighted according to the probability of the vehicles being on the road component (given by the probability of the route), and a decay factor in the case of earlier generated delay factors which would typically be of the order of a 10% linear reduction for each elapsed minute.

Thus the delay factors obtained for vehicle 12 by the above process would be as follows:

| Road Component | Delay Factor | Probability |
|---|---|---|
| A2a | 0.55 | 0.24 |
| A7d | 0.55 | 0.24 |
| A1d | 1.3 | 0.38 |

-continued

| Road Component | Delay Factor | Probability |
|---|---|---|
| A1e | 1.3 | 0.38 |
| Etc. | | |

The system then looks at a particular road component (A1e) and looks at all the available data (for different vehicles) for that road component and calculates a weighted average as follows:

| Vehicle | Delay Factor | Decay Factor | Probability | Weighting |
|---|---|---|---|---|
| 12' | 1.1 | 1.0 | 0.38 | 0.38 |
| 12" | 0.9 | 1.0 | 0.52 | 0.52 |
| 12"' | 1.3 | 0.8 | 0.40 | 0.32 |

Weighted Average = Σ(delay factor * weighting) / Σ(weighting) = 1.302/1.22 = 1.07

The raw weighted average delay factor is then converted into one or more different forms of traffic report suitable for export to the outside world. A particular simple form would be a text or synthesized voice force reporting the grade of delay, for example:

| Delay factor | Grading |
|---|---|
| <1.1 | no delay |
| 1.1–1.3 | moderate delay |
| >1.3 | heavy delay |

Thus in the above case the system would report no delays on the section of highway A1 between the junctions with A5 (road component A1e). From the figures this can be seen to be reasonable as vehicle 12" has been observed to have travelled faster than expected (delay factor=0.9) i.e. the full potential of the traffic speed on that road component at the time can be realised by those drivers who choose to do so—bearing in mind that some drivers may choose to drive at a speed lower than that which is actually open to them to use at that time, without being limited by traffic congestion to a speed below the expected speed of that road component.

What is claimed is:

1. A vehicular traffic flow monitoring method for monitoring vehicular traffic flow in a road network in an area served by a mobile telecommunications device network having a call management system provided with a mobile telecommunications device positioning system providing positional data in respect of at least active mobile telecommunications devices belonging to said mobile telecommunications device network, said method comprising the steps of:

a. capturing first geographical positional data for an active mobile telecommunications device in use on a vehicle at a given time $t_1$;
   b. intersecting said first geographical positional data with road network mapping data defining said road network in terms of road components each representing a discrete part of the road network, so as to identify original possible road components corresponding to said first geographical positional data;
   c. generating an initial probability vector representing the likelihood of said vehicle having arrived at a position on a given one of said original possible road for all of said original possible road components;
   d. capturing second geographical positional data for said mobile telecommunications device at a later time $t_2=t_1+\Delta t$ where $\Delta t$ is the actual transit time of said device between said first and second geographical positions;
   e. intersecting said second geographical positional data with said road network mapping data, so as to identify new possible road components corresponding to said second geographical positional data;
   f. identifying available routes in the road network linking said possible road components corresponding to said first and second geographical positional data which routes are constituted by a series of road components;
   g. generating an updated probability vector representing the likelihood of said vehicle having arrived at a position on a given one of said new possible road components in the road network corresponding to said second geographical positional data at said later time $t_2$ via one of said available routes, for all of said new possible road components;
   h. intersecting said available routes with expected average vehicle speed data for the road components of each of said series of road components constituting said available routes so as to determine expected transit times for said available routes;
   i. directly or indirectly comparing the actual transit time with the expected transit times for each of said available routes so as to produce delay factors for said routes indicative of the degree of vehicular traffic congestion on the individual road components thereof at the time; and
   j. determining an average delay factor for a plurality of vehicles using a given road component, which average is weighted on the basis of at least the likelihood of any of the available routes having been followed.

2. A method as claimed in claim 1, which method also includes the steps of:
   comparing expected route transit times with the actual transit time $\Delta t$, and revising the updated probability vector in the light thereof.

3. A method according to claim 1 wherein the geographical positional data is captured by using a positioning system selected from: Cell Global Identify+Timing Advance, Uplink Time-of-Arrival, Enhance Observed Time Difference, and Assisted Global Positioning System.

4. A method according to claim 1 which includes the preliminary step of capturing proto-geographical positioning data comprising the identity of a transmitter receiver station and an individual timing advance zone thereof, and intersecting said proto-geographical positioning data with a GDF geographical mapping data file comprising mobile telecommunications network infrastructure mapping data, so as to provide geographical positional data defining the position of a timing advance zone in which said vehicle based mobile telecommunications device is present.

5. A method according to claim 1 in which the positioning system is used to capture proto-geographical positioning data and convert it into geographical positioning data defining the position of a timing advance zone in which said vehicle based mobile telecommunications device is present.

6. A method according to claim 1 in which the positioning system is used to generate geographical positioning data defining the coordinates of an area in which said vehicle-based mobile telecommunications device is present.

7. A method according to claim 1 which includes the preliminary step of redefining the road network mapping in a geographical mapping data file in terms of road components representing each direction of travel in respect of any roads for which different directions of travel are not represented separately.

8. A method according to claim 1 which includes the preliminary step of redefining the road network mapping in a geographical mapping data file in terms of road components having a length not greater than a predetermined maximum length.

9. A method according to claim 1 wherein said available routes linking possible road components indicated by said first and second geographical positional data are identified by using a route finding algorithm.

10. A method according to claim 1 wherein the updated probability vector including the likelihood of said vehicle having followed each of the available routes is determined by means of a transition matrix comprising: possible road component positions and probabilities thereof defined by the initial probability vector, possible road component positions corresponding to said second geographical positional data, and said available routes linking said possible road component positions.

11. A method according to claim 10 wherein the likelihood of said vehicle having followed a given available route is weighted according to the relative compatibility of the actual transit time for said route with the expected transit time for said route whereby said transition matrix is converted to a time-dependent transition matrix.

12. A method according to claim 11 wherein routes having an expected transit time at least 20% greater than the actual transit time are disregarded.

13. A method according to claim 1 wherein individual vehicles included in the plurality of vehicles used for determining the average delay factor, are accorded a reduced weighting with increasing age of the actual transit time recorded for the individual vehicle concerned.

14. A method according to claim 13 wherein the weighting is progressively reduced to zero for increasing age up to an age of 10 minutes, whereby vehicle transit times determined more than 10 minutes previously are eliminated.

15. A method according to claim 1 wherein individual vehicles included in the plurality of vehicles used for determining the average delay factor are accorded a reduced weighting with increased transit time relative to those vehicles within said plurality having the shortest transit times.

16. A method according to claim 15 wherein data for individual vehicles having a transit time at least 50% greater than the median transit time for any of said plurality of vehicles, is disregarded.

17. A method according to claim 1 which includes the further step of exporting said delay factors to a user interface, for communication thereof to a user seeking a road traffic congestion report.

18. A method according to claim 17 which includes the step of converting said delay factor into a graphical and/or textual form indicative of the degree of road traffic congestion.

19. A method according to claim 1 wherein steps (d) to (j) are repeated cyclically in order to provide further updated probability vectors for a given vehicle and continue gathering route and transit time data for said vehicle for the purposes of determining average vehicle speeds for road components of downstream routes.

20. A road traffic network congestion reporting system suitable for use in conjunction with a mobile telecommunications device network having a call management system provided with a mobile telecommunications device positioning system, for monitoring and reporting on road traffic delays affecting the movement of vehicles through the road network, said reporting system comprising:

a storage device, and a processor connected to said storage device, the storage device storing:
 i) road network data representing the geographical position of road components making up said road network;
 ii) expected vehicle speed data for said road components of said road network; and
 iii) a program for controlling the processor;

said processor operative with the program to:
 a. capture first geographical positional data for an active mobile telecommunications device in use on a vehicle at a given time $t_1$;
 b. intersect said first geographical positional data with road network mapping data defining said road network in terms of road components each representing a discrete part of the road network, so as to identify original possible road components corresponding to said first geographical positional data;
 c. generate an initial probability vector representing the likelihood of said vehicle having arrived at a position on a given one of said original possible road for all of said original possible road components;
 d. capture second geographical positional data for said mobile telecommunications device at a later time $t_2=t_1+\Delta t$ where $\Delta t$ is the actual transit time of said device between said first and second geographical positions;
 e. intersect said second geographical positional data with said road network mapping data, so as to identify new possible road components corresponding to said second geographical positional data;
 f. identify available routes in the road network linking said possible road components corresponding to said first and second geographical positional data which routes are constituted by a series of road components;
 g. generate an updated probability vector representing the likelihood of said vehicle having arrived at a position on a given one of said new possible road components in the road network corresponding to said second geographical positional data at said later time $t_2$ via one of said available routes, for all of said new possible road components;
 h. intersect said available routes with expected average vehicle speed data for the road components of each of said series of road components constituting said available routes so as to determine expected transit times for said available routes;
 i. directly or indirectly compare the actual transit time with the expected transit times for each of said available routes so as to produce delay factors for said routes indicative of the degree of vehicular traffic congestion on the individual road components thereof at the time; and
 j. determine an average delay factor for a plurality of vehicles using a given road component, which average is weighted on the basis of at least the likelihood of any of the available routes having been followed.

21. A reporting system as claimed in claim 20, wherein said processor is also operative to:

compare expected route transit times with the actual transit time $\Delta t$, and revise the updated probability vector in the light thereof.

22. A reporting system according to claim 20 wherein the geographical positional data is captured by using a positioning system selected from: Cell Global Identify+Timing Advance, Uplink Time-of-Arrival, Enhance Observed Time Difference, and Assisted Global Positioning System.

23. A reporting system according to claim 20 wherein said processor is also operative initially to capture proto-geographical positioning data comprising the identity of a transmitter receiver station and an individual timing advance zone thereof, and intersect said proto-geographical positioning data with a geographical mapping data file comprising mobile telecommunications network infrastructure mapping data, so as to provide geographical positional data defining the position of a timing advance zone in which said vehicle based mobile telecommunications device is present.

24. A reporting system according to claim 20 in which the positioning system is used to capture proto-geographical positioning data and convert it into geographical positioning data defining the position of a timing advance zone in which said vehicle based mobile telecommunications device is present.

25. A reporting system according to claim 24 wherein data for individual vehicles having a transit time at least 50% greater than the median transit time for any of said plurality of vehicles, is disregarded.

26. A reporting system according to claim 20 in which said road network mapping data is in a geographical mapping data file in the form of road components representing each direction of travel for all bidirectional roads, including bidirectional single carriageway roads.

27. A reporting system according to claim 20 in which said road network mapping data is in a geographical mapping data file in the form of road components having a length not greater than a predetermined maximum length.

28. A reporting system according to claim 20 wherein said processor is operative to identify said available routes linking possible road components indicated by said first and second geographical positional data by use of a route finding algorithm.

29. A reporting system according to claim 20 wherein the processor is operative to update probability vectors including the likelihood of said vehicle having followed each of the available routes, by use of a transition matrix comprising: possible road component positions and probabilities thereof defined by the initial probability vector, possible road component positions corresponding to said second geographical positional data, and said available routes linking said possible road component positions.

30. A reporting system according to claim 29 wherein the likelihood of said vehicle having followed a given available route is weighted according to the relative compatibility of the actual transit time for said route with the expected transit time for said route whereby said transition matrix is converted to a time-dependent transition matrix.

31. A reporting system according to claim 30 wherein routes having an expected transit time at least 20% greater than the actual transit time are disregarded.

32. A reporting system according to claim 20 wherein individual vehicles included in the plurality of vehicles used for determining the average delay factor, are accorded a reduced weighting with increasing age of the actual transit time recorded for the individual vehicle concerned.

33. A reporting system according to claim 32 wherein the weighting is progressively reduced to zero for increasing age up to an age of 10 minutes, whereby vehicle transit times determined more than 10 minutes previously are eliminated.

34. A reporting system according to claim 20 wherein individual vehicles included in the plurality of vehicles used for determining the average delay factor are accorded a reduced weighting with increased transit time relative to those vehicles within said plurality having the shortest transit times.

35. A reporting system according to claim 20 in which the positioning system is used to generate geographical positioning data defining the coordinates of an area in which said vehicle-based mobile telecommunications device is present.

36. A reporting system according to claim 20 which includes a user interface and the processor is further operative to export said delay factors to said user interface, for communication thereof to a user seeking a road traffic congestion report.

37. A reporting system according to claim 36 wherein said processor is further operative to convert said delay factor into a graphical and/or textual form indicative of the degree of road traffic congestion.

38. A reporting system according to claim 20 wherein said processor is operative to repeat cyclically processing steps (d) to (j) in order to provide further updated probability vectors for a given vehicle and continue gathering route and transit time data for said vehicle for the purposes of determining average vehicle speeds for road components of downstream routes.

39. A vehicular traffic monitoring system suitable for use in the method of the present invention and comprising a computer system having:

a storage device; a processor connected to the storage device; and at least one interface connected to the processor, the storage device storing digital mapping information for a road network, expected vehicle speed for road components of said road network, and a database of at least: probability vectors representing the likely positions of moving active mobile telecommunications devices over a period of time and the likely routes thereof to said likely positions, and current road delay factor information;

said at least one interface coupling said processor to a mobile telecommunications device network call management system for interrogating said management system and receiving positioning data for active individual mobile telecommunications device therefrom; and coupling said processor to user enquiry systems for receiving road traffic delay enquiries from, and transmitting road traffic delay reports to, said user enquiry systems; and the processor operative with the program to:

a) capture geographical positional data for a mobile telecommunications device;

b) intersect said geographical positional data with road network mapping data defining said road network in terms of road components each representing a discrete part of the road network, so as to identify possible road components corresponding to said geographical positional data;

c) generate a probability vector representing the likelihood of said vehicle having arrived at a position on any of said possible road components;

d) identify available routes in the road network linking said possible road components corresponding to a given geographical positional data and preceding possible road component corresponding to a preceding geographical positional data, which routes are constituted by a series of road components;

e) intersect said available routes with expected average vehicle speed data for the road components of said series of road components constituting said available routes so as to determine expected transit times for said available routes;

f) directly or indirectly compare the actual transit time with the expected transit time for each of said available routes so as to produce delay factors for said routes indicative of the degree of vehicular traffic congestion on the individual road components thereof at the time;

g) determine an average delay factor for a plurality of vehicles using a given road component, which average is weighted on the basis of at least the likelihood of a given available route having been followed;

h) repeatedly update said database of moving active mobile telecommunication devices and road components with vehicle position and road delay factor information; and i) retrieve road delay factor information from said database in response to enquiries from user enquiry systems and provide road delay factor reports thereto.

40. A computer program product comprising:

a computer usable medium having computer readable code means embedded in said medium, said computer readable code means comprising a report generator for monitoring vehicular traffic flow in a road network and providing reports on congestion on individual roads in said road network, said report generator comprising executable program code for execution by a computer coupled with a mobile telecommunications device network having a call management system provided with a mobile telecommunications device positioning system providing positional data in respect of at least active mobile telecommunications devices belonging to said mobile telecommunications device network, wherein said executable program code:

a) captures geographical positional data for a mobile telecommunications device;

b) intersects said geographical positional data with road network mapping data defining said road network in terms of road components each representing a discrete part of the road network, so as to identify possible road components corresponding to said geographical positional data;

c) generates a probability vector representing the likelihood of said vehicle having arrived at a position on any of said possible road components;

d) identifies available routes in the road network linking said possible road components corresponding to a given geographical positional data and a preceding possible road components corresponding to a preceding geographical positional data, which routes are constituted by a series of road components;

e) intersects said available routes with expected average vehicle speed data for the road components of said series of road components constituting said available routes so as to determine expected transit times for said available routes;

f) directly or indirectly compares the actual transit time with the expected transit time for each of said available routes so as to produce delay factors for said routes indicative of the degree of vehicular traffic congestion on the individual road components thereof at the time; and g) determines an average delay factor for a plurality of vehicles using a given road component, which average is weighted on the basis of at least the likelihood of a given available route having been followed.

* * * * *